United States Patent [19]

Fujino et al.

[11] Patent Number: 4,494,844
[45] Date of Patent: Jan. 22, 1985

[54] LIGHT SHADING DEVICE FOR A CAMERA

[75] Inventors: Masahisa Fujino; Akio Sunouchi, both of Tokyo; Ryuji Suzuki; Tatsuo Konno, both of Kanagawa, all of Japan

[73] Assignee: Canon Kabushiki Kaisha, Tokyo, Japan

[21] Appl. No.: 386,234

[22] Filed: Jun. 8, 1982

[30] Foreign Application Priority Data

Jun. 18, 1981 [JP] Japan .................................. 56-90385

[51] Int. Cl.³ .......................... G03B 9/28; G03B 19/12
[52] U.S. Cl. ..................................... 354/241; 354/154
[58] Field of Search ............... 354/152, 154, 241, 277, 354/288, 242–244

[56] References Cited

U.S. PATENT DOCUMENTS 3,940,780  2/1976  Sato ..................................... 354/241

*Primary Examiner*—John Gonzales
*Attorney, Agent, or Firm*—Toren, McGeady and Stanger

[57] ABSTRACT

A light shading device for a camera in which a soft and elastic light shading curtain has a base part which is fixed on a flat support surface, in the region of the shutter running path. The free end of the shading curtain is brought into elastic contact with the shutter curtain by way of a step provided on the support, the step serving to incline the free end of the light shading curtain with respect to the support surface.

5 Claims, 3 Drawing Figures

F I G. 2
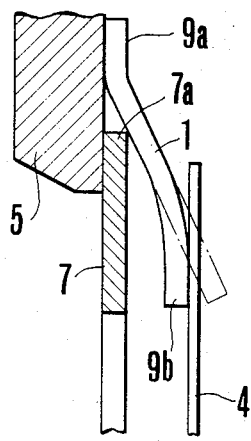
F I G. 3
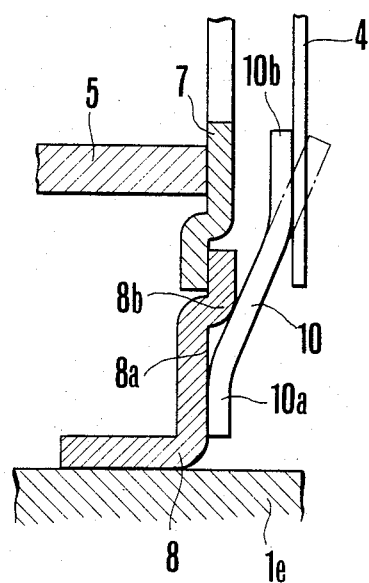

LIGHT SHADING DEVICE FOR A CAMERA

BACKGROUND OF THE INVENTION

1. Field of the Invention

The present invention relates to a light shading device for a camera having a focal plane shutter.

2. Description of the Prior Art

In the case of a camera having a conventional focal plane shutter in which both the leading and trailing shutter curtains having their ends wound on drums so as to run in front of the exposure window, it is well known that even when the shutter is closed, the light entering from the front surface of the camera comes through the exposure window, above and below the shutter curtain by reflection, to expose the film. In order to prevent such light from reaching the film, various kinds of light shading devices having an elastic light shading curtain, provided in the running path of the shutter curtain in such a manner that its end is normally in elastic contact with the shutter curtain, have been proposed. Such light shading devices have an excellent light shading effect because, even if the positions of the shutter curtains change before and after the shutter charge, namely in the state when the trailing shutter curtain covers the exposure window and in the state when the leading shutter curtain covers the exposure window, the end of the light shading member is in contact with the shutter curtain without fail.

For example, Japanese Utility Model Application Laid-Open No. Sho 51-115031 discloses a light shading device wherein the base portion of a piece of cloth, bent in advance, is fixed on the support provided near the shutter curtain so as to be parallel to the running direction of the shutter curtain in such a manner that the end of the cloth piece is in elastic contact with the shutter curtain. Further, as is disclosed in Japanese Utility Model Application Laid-Open No. Sho 50-65418, the mount surface of the support is inclined with respect to the shutter curtain, and the base portion of a flat cloth curtain is fixed in such a manner that its end is in elastic contact with the shutter curtain.

However, because the soft and elastic cloth curtain which has been bent by pressing, becomes straight with the lapse of time, the contact state with the shutter curtain changes so that the light shading efficiency decreases, while the shutter time is undesirably influenced because the friction with the shutter curtain changes.

Further, in the latter case, the treatment of the inclined mount surface is difficult and if the inclined mount surface is formed with another member in order to escape this difficulty, the construction becomes complicated and occupies much more space.

SUMMARY OF THE INVENTION

It is an object of the present invention to form a step on the mount surface for a light shading cloth curtain in order to incline the cloth curtain by making use of the step in such a manner that the free end of the cloth curtain is in contact with the shutter curtain. By means of such a construction, high light shading efficiency can be obtained without complicated forms of the cloth curtain and the mount surface. By properly adjusting the position at which the cloth curtain is fixed relative to the step, so as to adjust the inclination of the free end, it is possible to adjust the friction with the shutter curtain and stabilize the shutter curtain speed.

The present invention will be explained hereinbelow with reference to the accompanying drawings.

DESCRIPTION OF THE DRAWINGS

FIG. 2 is an enlarged sectional view showing the upper light shading curtain in detail; and FIG. 3 is an enlarged sectional view showing the lower light shading curtain in detail.

DESCRIPTION OF THE PREFERRED EMBODIMENT

Figure 1:
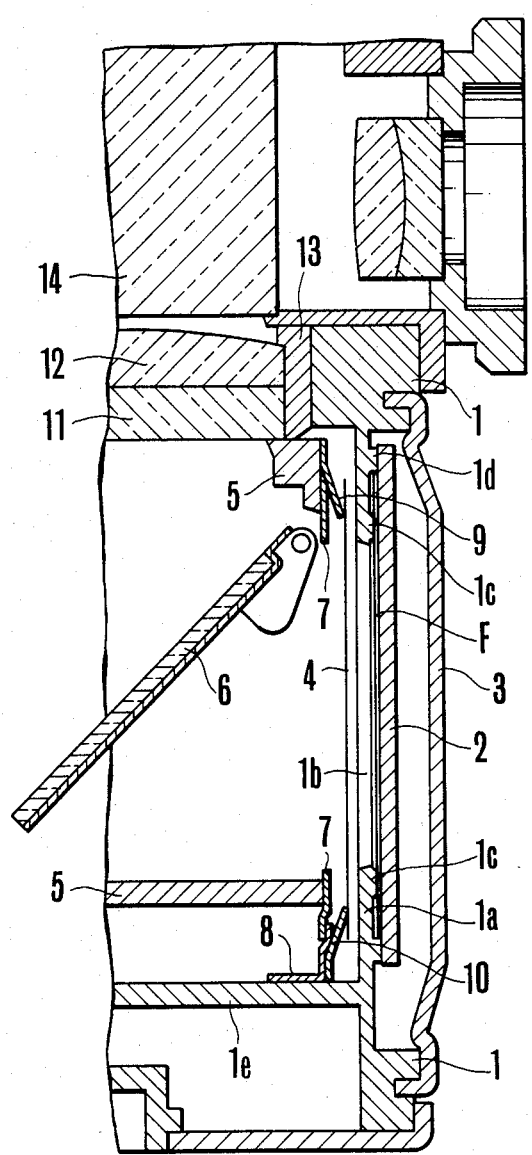
FIG. 1 shows a sectional view, as seen from the side of a single lens reflex camera having the light shading device of the present invention.

FIG. 1 shows a camera body 1 on whose front surface a lens mount (not shown) is provided. A photographing lens is mounted on the lens mount in a conventional way. A rear wall 1a of the camera body has an exposure window 1b and the film guide rails, 1c and 1d, are provided on the rear wall. A film pressure plate 2 is arranged on the back cover 3 via a spring which is not shown. The film F is fed one picture frame at a time in a direction normal to the paper in the drawing by means of a film winding device (not shown).

A focal plane shutter curtain 4 is constructed of a proper shutter material such as rubber coated cloth or titanium foil, and arranged to travel along the rear wall 1a in the path between the first surface of the rear wall of the camera body and the rear end of the mirror box, to be explained later, and to cover the exposure window 1b when the shutter is not operated.

A mirror box 5 includes a movable mirror 6 inside, which mirror is secured to the camera body. A light shading mask 7 which has an opening a little larger than the exposure window 1b is arranged in a plane parallel to the rear wall 1a.

A focusing plate 11 and a condenser lens 12 are arranged on the camera body by a holding frame 13. A conventional pentagonal prism 14 is arranged above the condenser lens so as to constitute the finder optics.

Between the lower part of the mirror box 5 and the bottom wall 1e of the camera body, there is a space in which an automatic diaphragm lever (not shown) and other parts are arranged. The light entering from the front face of the camera into this space is prevented from being directed to the exposure window 1b by the light shading plate 8 secured on the bottom wall 1e, and the light shading mask 7. Namely, light passing through parts other than the opening of the light shading mask 7 never reaches the exposure window.

Elastic light shading curtains 9, 10 are constructed of black rubber-coated cloth or titanium foil, such as used for the shutter curtain, and cut in a rectangular shape a little larger than the exposure window.

As is shown in FIG. 2, the base part 9a, of the upper light shading curtain 9, is fixed on the rear end surface of the mirror box with the adhesive. The curtain 9 is bent at a position near the base part, and is in contact with the upper end 7a of the light shading mask 7 in such a manner that the end 9b is deflected, as is shown in the two dot dash line, thus being in elastic contact with the shutter curtain 4. The light shading plate 8 is used as the support of the lower light shading curtain 10. As is shown in FIG. 3, step 8b is provided on the light shading plate 8 in such a manner that the lower light shading curtain is inclined in the same way as the upper curtain by making use of the step. Namely, the base part 10a of the light shading curtain 10 is fixed on the plane 8a of the lower part of the light shading plate 8, and the lower curtain 10 is inclined backwards by step 8b in such a manner that the end 10b is normally in light contact with the shutter curtain 4.

In order to fix the light shading curtain on the lower part of the light shading plate 8, the base part 10a of the light shading curtain is put on the surface of the base support provided with adhesive in advance and then, by pressing the base part at a certain determined distance from the step 8b with a proper tool like scale, the light shading curtain is fixed with a certain determined inclination, and therefore applies a constant pressure against the shutter curtain.

In case of the present embodiment, the step for the upper support is formed with the mirror box 5 and the light shading plate 7, while that for the lower support is provided by the light shading plate 8 itself. It is of free choice, in accordance with necessity, whether the step is formed with one member or two members.

As explained above in accordance with the present invention, the light shading curtains 9, 10 are fixed on the supports 5, 8, and have a certain determined inclination in a simple construction, without using any special member or any special working. Therefore no change in operation of either light shading curtain takes place with the lapse of time, and high light shading efficiency is obtained with no undesirable influence on the shutter curtain speed.

What is claimed is:

1. A light shading device for a camera having a focal plane shutter comprising:
    a rear wall forming a part of the camera body for defining an exposure window;
    a shutter curtain arranged to run in a shutter curtain running path extending in front of said exposure window so as to open and close said exposure window;
    a plurality of supports fixed in the camera body arranged to face said shutter curtain running path, each of said supports defining a planar surface extending generally in parallel relationship to the plane of said shutter curtain and a protuberant part defined with a stepped configuration extending outwardly from said planar surface toward said shutter curtain; and
    a light shading curtain consisting of a relatively soft resilient material, said light shading curtain including a base part which is rigidly affixed on said planar surface and a projecting part extending from said base part with its end in abutting contact with said shutter curtain;
    said projecting part having a generally planar surface in abutting contact with said protuberant part to be resiliently deflected in order to urge said end thereof into contact with said shutter curtain said protuberant part being defined by a pair of nonparallel generally planar surfaces both of which extend transversely to said abutting surface of said projecting part, said base part being located on said planar surface relative to said protuberant part so that the cooperation between said protuberant part and said projecting part operates to effect a particular spacing between said base part and said abutting contact thereby to effect a desired resilient pressure with which said end of said projecting part abuts said shutter curtain.

2. A light shading device according to claim 1, including a light shading mask supported in the camera body in front of the exposure window, and wherein the shutter curtain running path is formed by said rear wall of the camera body and said light shading mask.

3. A light shading device according to claim 1, wherein the light shading curtain comprises a rubber coated cloth.

4. A light shading device according to claim 1, wherein the light shading curtain comprises titanium foil.

5. A light shading device according to claim 3 or claim 4 wherein the light shading curtain is of a rectangular shape, having a side longer than that of the exposure window.

* * * * *